May 3, 1966  O. L. STEWART  3,249,423
FURNACE COMBINATION AND METHOD
Filed May 7, 1962  4 Sheets-Sheet 1

INVENTOR.
ORALD L. STEWART
BY
*Fay & Fay*
ATTORNEYS

May 3, 1966
O. L. STEWART
3,249,423
FURNACE COMBINATION AND METHOD
Filed May 7, 1962
4 Sheets-Sheet 2
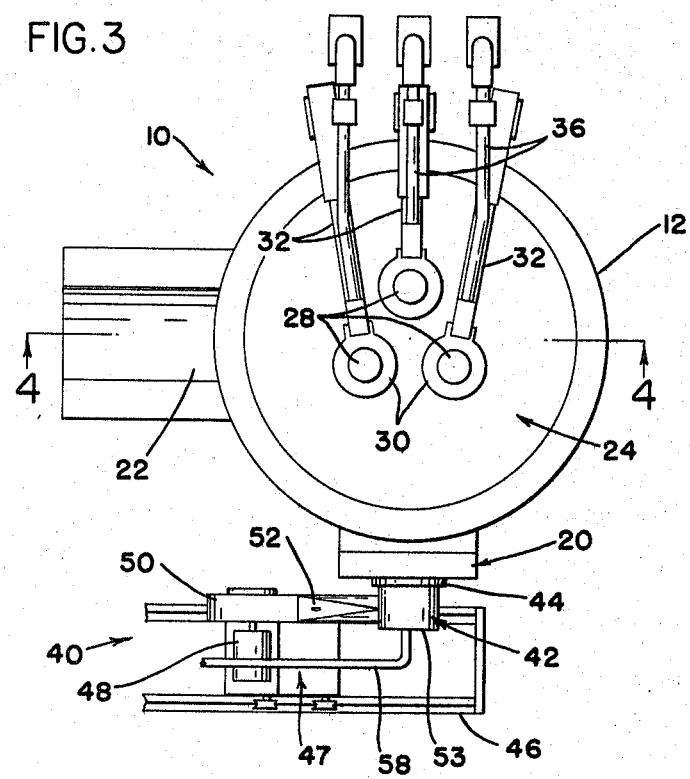
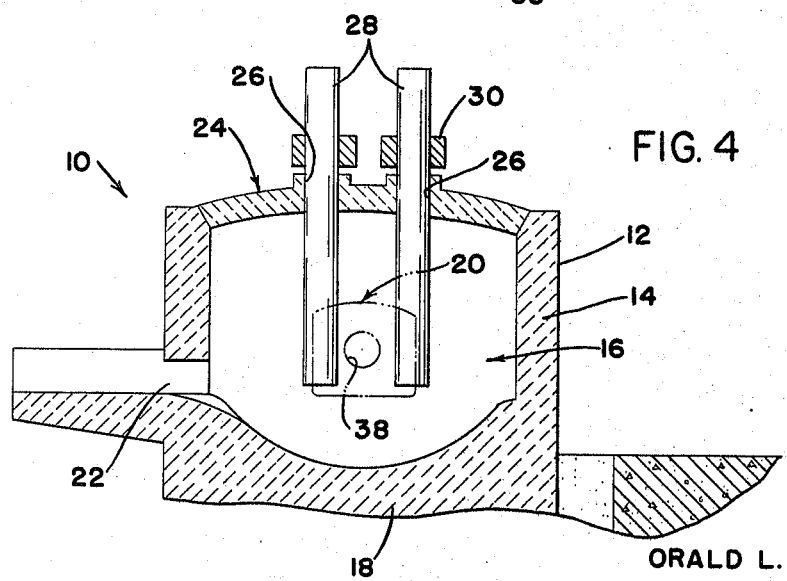
INVENTOR.
ORALD L. STEWART
BY
Fay & Fay
ATTORNEYS May 3, 1966

O. L. STEWART 3,249,423

FURNACE COMBINATION AND METHOD

Filed May 7, 1962

INVENTOR.
ORALD L. STEWART
BY

*Fay & Fay*

ATTORNEYS

May 3, 1966 O. L. STEWART 3,249,423
FURNACE COMBINATION AND METHOD
Filed May 7, 1962 4 Sheets-Sheet 4

INVENTOR.
ORALD L. STEWART
BY
*Fay & Fay*
ATTORNEYS

United States Patent Office 3,249,423
Patented May 3, 1966

3,249,423
FURNACE COMBINATION AND METHOD
Orald L. Stewart, Rocky River, Ohio, assignor to Cleveland Metal Abrasive Co., Cleveland, Ohio, a corporation of Ohio
Filed May 7, 1962, Ser. No. 192,840
4 Claims. (Cl. 75—11)

This invention relates to a method and apparatus for melting a charge of metal in a furnace for the production of metal alloys and metal castings. More specifically, the invention relates to a combination of a direct arc electric furnace and a portable combustion unit for directly applying to a charge of metal in the furnace a flame resulting from the combustion of a gaseous hydrocarbon fuel and blower forced air while simultaneously enveloping said charge in a stream of inert gas resulting from said combustion.

In the manufacture of alloys and castings, in the metal producing industries, the use of direct arc electric furnaces has become extremely widespread. However, significant problems of economy have been created in the use of electric furnaces for metal melting because of the inherent limitations of time for melting a maximum capacity charge electrically and the high rates of consumption of expensive electric power which are required to melt a cold metal charge. The power and electrode consumption rate during the initial or melting period of electric furnace operation is extremely expensive and is often several times the consumption rate which occurs during the refining period which follows it. A principal reason for the auxiliary combustion unit-electric furnace combination of this invention is the minimization of the manufacturing costs which arise from the extreme power demands and time-consuming operation of electric furnace cold charge melting.

From the start of melting of the charge in an electric furnace to its completion, oxidation occurs within the furnace in varying degrees such that in producing steel, for example, the phosphorous, silicon, manganese, carbon, and other elements present are oxidized into the form of slags and gases. This oxidation process provides the "cleaning" of the steel and at the same time results in some undesirable loss of carbon and other alloying elements. Accordingly, after the steel has become melted and the slag tapped, final additions of carbon and alloying elements may be charged in the furnace to compensate for the lost carbon and desired elements and to arrive at the correct chemical composition of the melt. A problem arises, however, in that if too much of the carbon and other elements have been burned from the furnace charge during the melting and refining or slagging operations, large compensating additions of carbon and alloying elements must be made which result in undesirable and premature chilling of the bath. Accordingly, it is extremely advantageous to minimize and control the amount of oxidation of the carbon that occurs so that the adjusting additions required are not great enough to significantly change the temperature of the melted charge.

The prior art attempts to solve the problems of expensive power consumption during electric furnace metal melting have resulted in various schemes and procedures for utilizing auxiliary combustion means with conventional electric furnaces. Typical of these prior art attempts, has been a provision of elaborate and inefficient combustion equipment placed in specialized geometric arrangements around the interior cavity of the electric furnace to provide auxiliary heat to aid the furnace electrodes during the melting operation.

A significant problem of increased oxidation of the carbon and other alloying elements has resulted from the use of the heretofore known auxiliary heating means because of the incomplete combustion of the hydrocarbon fuel and air and the resulting presence of entrained oxygen in the flame which enters the area of the metal and indirectly increases its oxidation. This increased oxidation of the carbon and other elements has resulted in a detrimental necessity for large compensating additions to the melted charge of expensive refined additives in amounts which have created a chilling effect on the molten metal bath.

Recent attempts to eliminate objectional excess oxygen content from these auxiliary flames have resulted in various expensive and complicated types of burners with special premixing and precombustion chambers. These burners, because of their particular flame producing characteristics, have been of necessity arranged so as not to apply the flame directly to the charge because of the likelihood of exposure of the charge and the electrodes positioned in the center thereof to damaging excess oxidation. A technique of merely tangentially or peripherally applying the flame from the auxiliary heating means around the charge has resulted and a compromise with the efficient use of the heat produced by the flame has been made which necessitates greater fuel consumption than would be necessary if the flame could be applied directly to the center of the charge.

The electric furnace and auxiliary combustion unit of the present invention has been devised to minimize the undesirable oxidation of the carbon and other alloying elements of the metal charge while permitting efficient use of the flame directly upon the central portion of the charge. Accordingly, a result of this new arrangement has been the virtual elimination of the problem of chilling of the melt by large and expensive compensating additions of carbon and alloying elements and the elimination of any detrimental effect to the electrodes of the electric furnace.

The principle of the present combination is the result of the combustion of air and natural gas of the type commercially supplied to industrial users, in an open faced burner which generates large amounts of inert nitrogen during combustion and applies the inert nitrogen to the charge and electrodes simultaneously with the application of the flame such that no significant increase in the normal rate of oxidation of either the metal or the electrodes can occur in the furnace. In effect, an inert envelope for the charge and electrodes is continually supplied thereto and flushed through the furnace and out the vents, electrode openings, and tap hole, while the burner applies the flame directly upon the charge for maximum utilization of the B.t.u. output of the burning fuel. These results have been accomplished without the necessity of the provision of special geometric arrangement of the burner or major modification of conventional electric furnaces, and are obtained with an elimination of the necessity of specialized precombustion chamber burners or fuels.

With the problems of the prior art devices in mind and the advantages of the instant invention briefly stated, it is a general object of the invention to provide an electric furnace and auxiliary combustion unit for increased economy in the production of metal and metal alloys.

It is a further object of the invention to provide an electric furnace-gas combustion combination adapted particularly for use where high power costs of a particular area render the production of metal in direct arc electric furnaces expensive relative to other melting procedures.

It is a further object of the invention to provide a direct arc electric furnace having a simple portable combustion unit mechanically attached thereto when desired for increased melting capacity of the electric furnace.

It is an additional object of the invention to provide an electric furnace with auxiliary gas combustion means oriented with respect to the interior of said furnace to apply directly to the charge of metal in said furnace a radially extending flame enveloped by a continuous shroud of inert atmosphere.

It is a more specific object of the invention to provide a direct arc electric furnace and auxiliary gas combustion system which minimizes undesired oxidation of the metal charge and eliminates damage to the electrodes while applying a flame directly into the metal charge.

A further object of the invention is to provide an efficient method of heating a charge of metal in an electric furnace while simultaneously enveloping the charge in inert atmosphere to minimize undesired oxidation of the charge and damage to the electrodes.

Further and more specific objects of the invention will become apparent from the description to follow.

FIG. 3 is a top view of the furnace and combustion unit combination illustrated in FIG. 1.

FIG. 4 is a cross-sectional elevational view of the furnace taken along line 4—4 of FIG. 3.

Figures 1, 2:
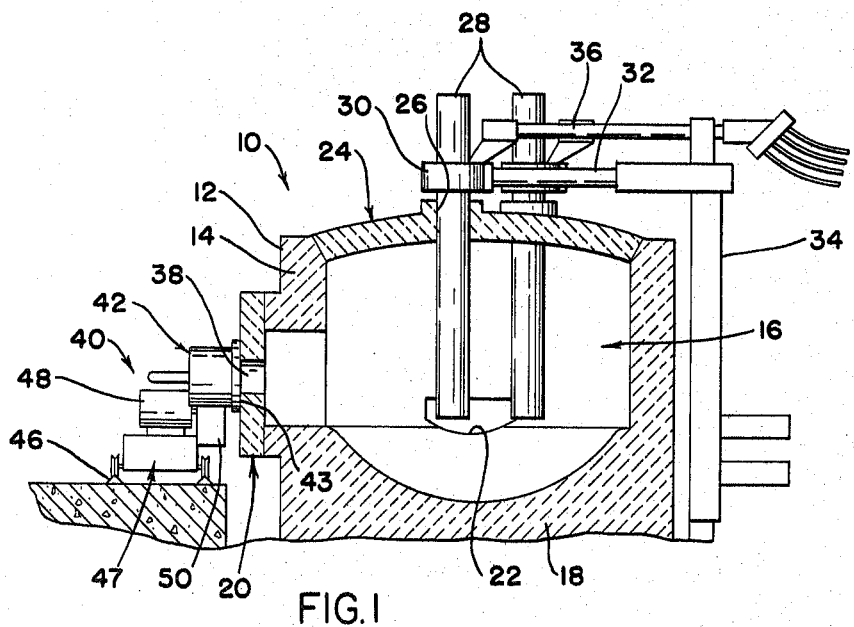
FIG. 1 is a cross-sectional elevational view of a conventional direct arc electric furnace with the portable combustion unit attached thereto.
FIG. 2 is an enlarged end view of the portable combustion unit of the invention with a portion of the burner means broken away for illustrative purposes.
Figure 5:
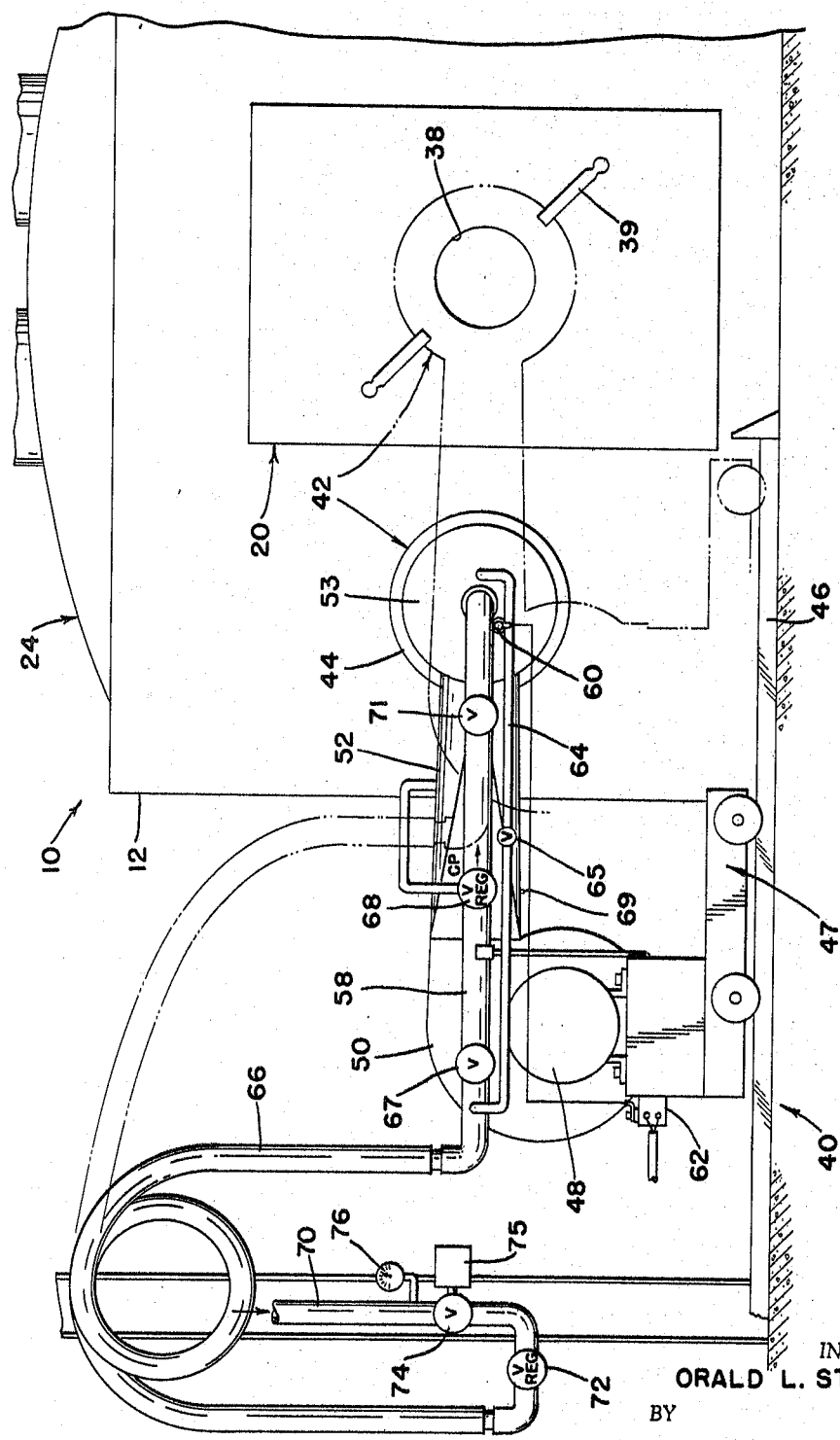
FIG. 5 is a side elevational view illustrating the combustion unit and electric furnace combination of the invention in an unattached position with the attached position shown in phantom.
Figure 6:
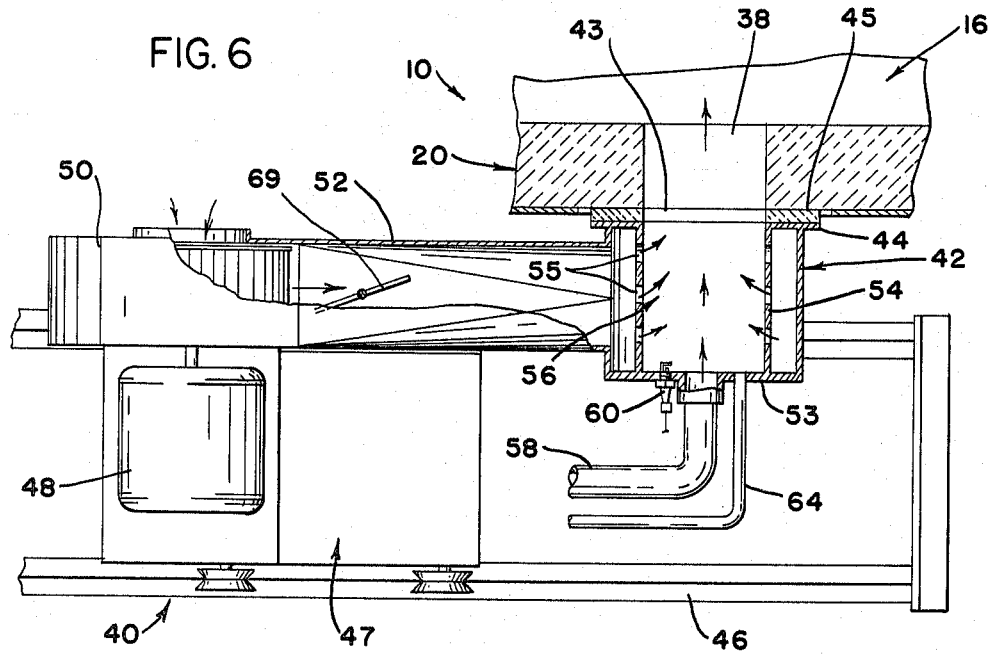
FIG. 6 is a detailed top view of the combustion unit partially in cross-section to illustrate the combustion system in its attached and operating position.
Figure 7:
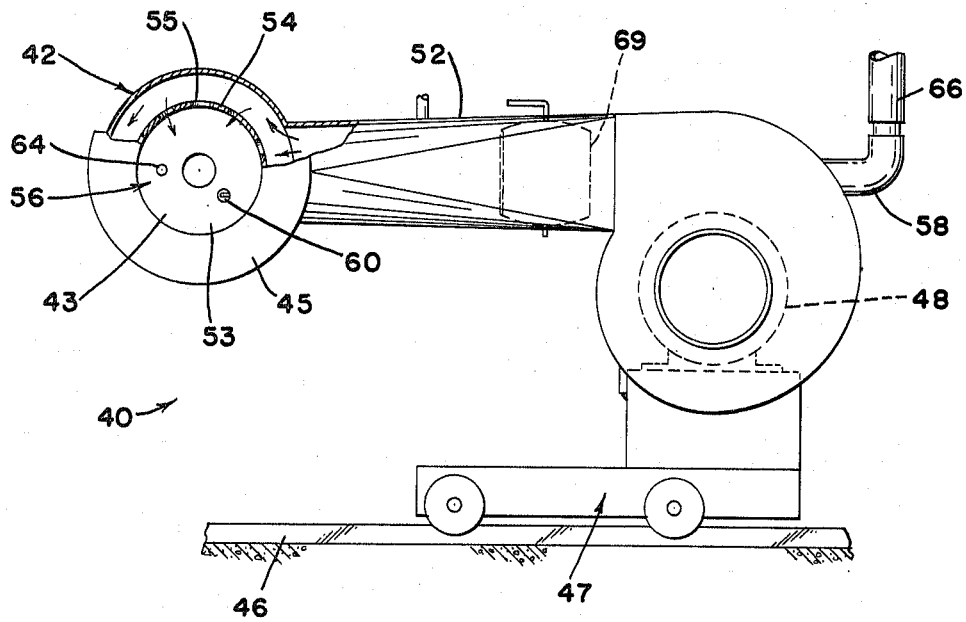
FIG. 7 is a side elevational view illustrating the combustion unit side which attaches to the furnace.

As will be seen in FIG. 1, for instance, the electric furnace 10 comprises a generally cylindrical metal shell 12 having a refractory brick lining 14 which forms an interior generally cylindrical cavity 16 having either an acid or basic type of lined working bottom or hearth area 18. A refractory lined charge door 20 is provided in one side of the shell 12, and a tap hole and spout 22 is circumferentially spaced at ninety degrees from the charge door 20 in conventional manner. Suitable vent holes, not shown, may be provided as deemed necessary or expedient in the wall of the shell 12 to facilitate the release of gases from the furnace.

A somewhat dome shaped roof 24 is removably mounted on the furnace and has provided therein three apertures as shown at 26. An elongated graphite or carbon electrode 28 is provided in each of the apertures 26 and conventional clamping means 30 are provided on supporting arms 32 which extend from a mast 34 located adjacent the furnace such that the mast may be raised and lowered by suitable mechanical means to raise and lower the electrodes relative to the metal charge in the hearth area 18. Power supply cables 36, supported by arms 32 connect the electrodes 28 to transformers (not shown) for the regulated supply of electrical energy to the furnace. Suitable crane means or other mechanical devices may be provided, as is well known, for the removal of the roof 24 from the furnace for top charging or where it is desired, the furnace may be charged through the door 20. After the furnace has been charged and the melting and refining operations are completed, the furnace may be tilted forwardly in the direction of the tap hole and spout 22 to pour or tap the metal from the furnace. Suitable mechanical rocking mechanisms for tilting the furnace are conventional in the art and are, accordingly, omitted from the drawings.

In providing the furnace combination according to the present invention the charge door 20 is provided with an annular opening 38 through which a portable combustion unit, generally designated by the numeral 40 and having a generally cylindrical burner 42, may supply simultaneously in intense flame and stream of inert nitrogen directly toward the metal charge in the hearth area 18. The portable combustion unit 40 is mechanically secured to the door 20 with the cylindrical burner 42 axially aligned with an open face 43 and an annular flange 44 surrounding said bore concentric with the opening 38. A refractory or stainless steel ring 45 is provided on the flange 44 between the door 20 and flange 44 to protect the edge of the opening 38 from the flame and to provide a seal to prevent action of air into the furnace adjacent the flame.

A plurality of quick-acting cam release clamps 39, on the door 20 insure rapid mechanical locking and unlocking of the burner housing 42 to the door 20 by means of engagement with the annular flange 44. The unit 40 includes a four wheel truck 47 for movement into and out of engagement with the charge door 20 on a track 46 such that it may be intermittently moved into position for auxiliary firing and out of position for tilting of the furnace and opening of the door 20 for side charging of the furnace.

In addition to the burner 42 the portable combustion unit 40 includes an electric motor 48 and a low pressure air blower 50 which is driven thereby to supply air to the burner 42 through an air conduit arm 52. The burner 42 with its open side 43 defines a generally flat-bottomed cup shaped member having an open ended perforated sleeve 54 concentric therewith and mounted in the bottom 53 thereof. A plurality of perforations 55 allow the flow of air through sleeve 54 from the air conduit 52 into the central combustion cavity 56 of the burner 42. A gas supply pipe 58 is attached to the flat bottom 53 of the cup shaped burner 42 coaxial with sleeve 54 such that gas may be propelled at a regulated line pressure directly into the cavity 56. Under the pressure of air created by the low pressure blower 50 in the conduit 52 and the passageway between the outer shell of the burner 42 and the perforated sleeve 54, the air flows radially inwardly through perforations 55 toward the stream of gas from the supply line 58 and simultaneously mixes therewith and burns within the chamber 56. The extreme pressures created by this combustion and the added force of the air rushing through the holes 55 into the chamber 56 projects the flame axially out of the open side 43 of the chamber through the opening 38 in the charge door and directly upon the metal charge in the hearth.

In the wall 53 of the burner 42, adjacent the gas supply line 58, is provided a spark plug 60 for ignition of the burner. The ignition plug 60 is connected to a transformer 62 of conventional type which supplies the necessary voltage when energized to fire the spark plug for ignition to the burner. Also provided for ignition purposes in the wall 53, is a pilot gas supply line 64 which because of its relatively small diameter provides a limited supply of gas for ignition and thereby prevents violent explosions which might result from ignition of the gas from the line 58 directly. A suitable gas shut-off valve 65 is provided in pilot line 64 to control the flow as necessary and desirable for ignition.

As will be observed, the burner just described works somewhat differently from air-gas burners heretofore used in connection with electric furnaces, in that no mixing occurs prior to entrance of the gas and air into the open faced combustion chamber itself. Moreover, there is no conventional type of nozzle to restrict or confine the positive forward flow of the resulting flame and nitrogen and as a result, the burner projects a relatively wide flame and nitrogen stream directly against the metal charge such that a relatively uniform and efficient heating results within the protective inert gas shroud which is continually flushed over the surface of the charge and then out through the electrode openings, tap hole, and vents forcing ahead of it the static air within the furnace shell.

The gas supply line 58 is connected at its input end to a flexible gas supply line 66 to permit movement of the combustion unit 40 along the track 46 into and out of engagement with the furnace and mounted in series from its input end in the pilot branch line 64, a gas shut-off valve 67 of the conventional rotary type, and an air-gas ratio regulating diaphram 68 which is tied in to the air supply through duct 52 such that the air-gas pressure ratio may be controlled and maintained constantly. Other valves are conveniently provided, such as a damper 69 in the air duct 52 for manual air supply control, and a gas valve 71 at the end of line 58, for final adjustment of gas flow rate.

The gas source line illustrated at 70, to which the end of the flexible gas supply line 66 opposite the line 58 is attached, has a diaphragm type regulator 72 provided therein to account for seasonal variations in the gas pressure from the source. Also provided in the source line 70 is a safety shut-off valve 74 which is keyed to a pressure sensitive switch 75 to insure automatic shut-off if the flexible line 66 should be damaged or severed. Suitable gauges as schematically shown at 76 may be provided as desired to read the line pressure.

Various modifications of the control system are contemplated, where desired, and semi-automatic controls keyed to demand meters recording the use of power by the electric furnace electrodes may be used such that when a certain electric power consumption has been reached, an automatic circuit means will automatically sound an alarm to warn the operators to switch to auxiliary firing or to ignite the gas burner and turn off or reduce the power to the electrodes. This arrangement is quite effective where power is purchased on a demand per period rate basis of the type used by many power companies located in industrial areas.

One convenient manner of using the auxiliary combustion unit in connection with a particular heat of the furnace, is to operate the auxiliary combustion unit until the scrap is 80% to 90% molten and then shut it off. By thus utilizing the auxiliary unit, the high tap of the electric furnace, which is the most costly, is seldom necessary since the refining and final melting stage requires very little power compared to the initial stages of the melting operation.

The principle of the use of the mechanically attached portable combustion unit for applying a flame directly to a charge of metal in the hearth area of an electric furnace has heretofore been thought impossible because of the objectionable oxidation and burning out of carbon and other necessary alloying elements along with the attendant damage and premature burning of the electrodes. The particular arrangement described, whereby the open face of a combustion chamber, which directly receives a proper ratio of air and gas, is directly exposed and aimed on a charge of metal, can only be utilized where this undesirable oxidation can be eliminated or minimized.

The burner and furnace combination in the illustrated example has utilized, for example, natural gas provided by the Ohio Fuel Gas Company in Toledo, Ohio, which has a specific gravity of about 0.63 and an approximate composition of 85.5% methane, 12.5% ethane, 0.2% carbon dioxide, and 3.8% nitrogen with a B.t.u. per cubic foot rating of approximately 1047. Accordingly, the gas of this example requires approximately 10 cubic feet of air per cubic foot of gas for complete combustion of the fuel. Since the burner of the invention has a diaphragm type ratio regulator 68 controlling the air-gas ratio supplied to the burner, the burning of the gas mentioned, will occur in approximately the exact theoretical ratio of air to to gas of 10:1. Because of the fact that air is predominatly a mixture of nitrogen and oxygen in the ratio of approximately 20% oxygen and 79% nitrogen an illustration of the reaction involved in burning a mixture of air and natural gas, i.e., a gas, for example, comprising approximately 86% methane and 13% ethane, can be exemplified by the equations (1) $2CH_4 + 2O_2 \xrightarrow{\Delta} CO + CO_2 + 3H_2 + H_2O$ (2) $C_2H_6 + 2O_2 \xrightarrow{\Delta} CO + CO_2 + 2H_2 + H_2O$ In addition to these product gases the predominant gas produced is nitrogen. Thus, for example, in burning approximately 50,000 cu. ft. of air with natural gas, approximately 40,000 cu. ft. of nitrogen is produced. It is this large volume of nitrogen which, in effect, controls the atmospere in the furnace. The volume and pressure of inert gas passing to the furnace sweeps or purges the undesirable oxidizing gases for the heat as they evolve and produces a continually flushing inert envelope over the charge and around the electrodes, thus minimizing the amount of carbon loss due to oxidation. The gases supplied to the furnace due to the combustion are predominantly inert or purging gases in that, for example, by burning approximately 1 cu. ft. of the type gas mentioned above with 10 cu. ft. of air approximately 73% of the total gases present is nitrogen with the balance of the gases present being predominantly of carbon monoxide and carbon dioxide and hydrogen. The volume or proportion of product gases will depend, however, upon the completeness of the reaction of the gases with the air. Accordingly, an incomplete combustion will result in smaller amounts of nitrogen and other product gases. Thus, to obtain a maximum efficiency of the system it is essential that the burner be designed to give as near as possible the theoretical yields. The burner 42 of the present invention has been found to be extremely efficient in this respect and the production of nitrogen during use of the burner for auxiliary heating of the electric furnace charge approaches the theoretical amount for a given natural gas. It will be recognized that natural gases vary in composition, but it is contemplated that the described utilization of the burner combustion products will provide a sufficient inert gas envelope if the nitrogen production for any given gas exceeds 50% the total gases produced. Examples of such natural gases are well known and include gases from many geographical locations.

In utilizing the portable combustion unit of the present invention in combination with an electric furnace having a 6 ton capacity, for instance, it has been found that the melting time for a cold charge has been decreased so that it is possible to get 5 heats instead of 4 in a little less than a normal 8 hour working shift with a gas consumption of approximately 5,000 cu. ft. per hour. The corresponding production of heat for this quantity of natural gas is in the neighborhood of 5,000,000 B.t.u.'s per hour and a somewhat similar B.t.u. production from the electrodes by an intermediate tap of the electric furnace is utilized simultaneously therewith. These figures must be considered with respect to the fact that the high tap of the electric furnace is extremely costly relative to the lower or intermediate taps and the minimization or elimination of the necessity of high tap operations results in considerable economy in the melting operation. This economy is possible, of course, because of the creation of nitrogen in the burner, during the combustion example given, at the rate of approximately 40,000 cu. ft. per hour simultaneously with the application of the flame directly toward the charge and operating electrodes.

The effective protection of the charge and the electrodes from oxidation during these extreme conditions is enhanced by the wide cross-sectional area of the flame and nitrogen gas stream provided by the described open faced burner in that a substantial portion, if not all, of the charge is substantially uniformly heated and protected as the combustion continues. The tremendous amounts of nitrogen being introduced into the furnace during this operation force out the bulk of the static air in the furnace through the tap hole, vents and electrode openings, such that the furnace, particularly in the charge area, has an almost completely enveloping nitrogen shroud.

A noticeable decrease in the consumption rate of the electrodes has resulted because of this surrounding of the electrodes by the rising heated nitrogen as it continually flows out through the electrode openings. The effects of this inert atmosphere have been found not to be detrimental to the composition of the charge and have, in fact, standardized the quality of the melts produced in the furnace. This is true because in the dry state, nitrogen gas is entirely passive to iron. It should be obvious, however, that if the high nitrogen content in the atmosphere is found to be detrimental in any respect to the particular alloying process being performed in the electric furnace-auxiliary combustion unit combination, the percent of nitrogen in the furnace can be varied by the provision of additional vents in the furnace and an increase of gas in the combustion mixture. It has been found, however, that no detrimental effect results from the continuous nitrogen shroud provided by the process and apparatus of this invention in normal metal producing operations.

For ease of description the principles of the invention have been set forth in connection with but a single illustrated embodiment. It is not my intention that the illustrated embodiment nor the terminology employed in describing it be limiting inasmuch as variations in these may be made without departing from the spirit of the invention. Rather I desire to be restricted only by the scope of the appended claims.

The invention claimed is:

1. A direct arc electric furnace having exposed carbonaceous electrodes and a generally cylindrical interior configuration having removably attached burner means in substantially sealed communication through an opening in the side of said furnace to maintain a positive pressure in said furnace, said burner means being oriented to apply directly to a charge of metal in said furnace at substantially the level of said charge and radially toward said electrodes a flame and quantity of inert gas in excess of 50% of the total gases resulting from the combustion of forced-air and a gaseous hydrocarbon fuel mixture in said burner means.

2. The method of heating a charge of metal in a direct arc electric furnace having exposed carbonaceous electrodes comprising orienting a burner means having a combustion chamber with an open flame discharge face such that the flame will be discharged radially substantially toward said electrodes and said charge of metal, mechanically securing said oriented burner to the furnace, energizing said electrodes, forcing air by means of a blower into said chamber and simultaneously introducing thereto a gaseous hydrocarbon mixture to provide air and gaseous hydrocarbon in their approximate ratio of complete combustion, and burning said mixture in said chamber such that the pressure within said chamber created by said blower and said burning causes positive pressure in said furnace and a discharge of flame out of the open face of the burner directly toward said charge of metal at substantially the level of said charge.

3. The method of using an auxiliary gas combustion unit in combination with a direct arc electric furnace having carbonaceous electrodes to heat a charge of metal with a B.t.u. input greatly in excess of the input resulting from operation of the furnace electrodes within a predetermined limit of cumulative electric power consumption per unit of time, comprising the steps of:
energizing the electrodes, observing the cumulative quantity of power consumed during energization of the electrodes,
maintaining said cumulative quantity below said limit by adjustment of the electrode B.t.u. output,
and applying an intense flame from the said auxiliary gas combustion unit directly upon said charge of metal to provide a B.t.u. input thereto greatly in excess of that provided by operation of the electrodes within said predetermined limit.

4. An auxiliary combustion unit for intermittent attachment in substantially sealed communication with the interior of a direct arc electric furnace having exposed carbonaceous electrodes comprising:
a flanged burner having a central open-faced air and gas combustion and mixing cavity,
a gas supply means in communication with said cavity and attached to a gas source by means of a flexible conduit,
low pressure blower means for supplying air to said cavity,
pressure regulating means for maintaining a constant ratio of pressure between the gas supply means and the air supply means,
flow control means on each of said supply means to permit adjustment of the quantities of gas and air entering said cavity,
electrical ignition means for generating a spark in said cavity,
pilot gas supply means for introducing a limited supply of gas for ignition of said burner means,
and mobile support means for moving said burner means into and out of substantially sealed communication with the interior of said furnace through an opening in the side of said furnace to maintain a positive pressure in said furnace and direct the flame and supply of inert gas resulting from the combustion of forced air and gas radially towards the electrodes at the level of the charge.

References Cited by the Examiner

UNITED STATES PATENTS

| | | | |
|---|---|---|---|
| 984,371 | 2/1911 | Hoff | 266—33 |
| 1,084,991 | 1/1914 | Wills | 13—2 |
| 1,556,698 | 10/1925 | Lee | 266—5 |
| 2,040,328 | 5/1936 | Olson | 266—5 |
| 2,927,142 | 3/1960 | La Bate | 266—33 X |

FOREIGN PATENTS 26,184 11/1911 Great Britain.

JOHN F. CAMPBELL, *Primary Examiner.*

RAY K. WINDHAM, *Examiner.*

F. R. LAWSON, J. C. HOLMAN, *Assistant Examiners.*